W. F. RITTMAN.
TREATMENT OF XYLENE AND OTHER SIMILAR HYDROCARBONS.
APPLICATION FILED JULY 7, 1915. RENEWED DEC. 27, 1921.
1,419,124.
Patented June 6, 1922.
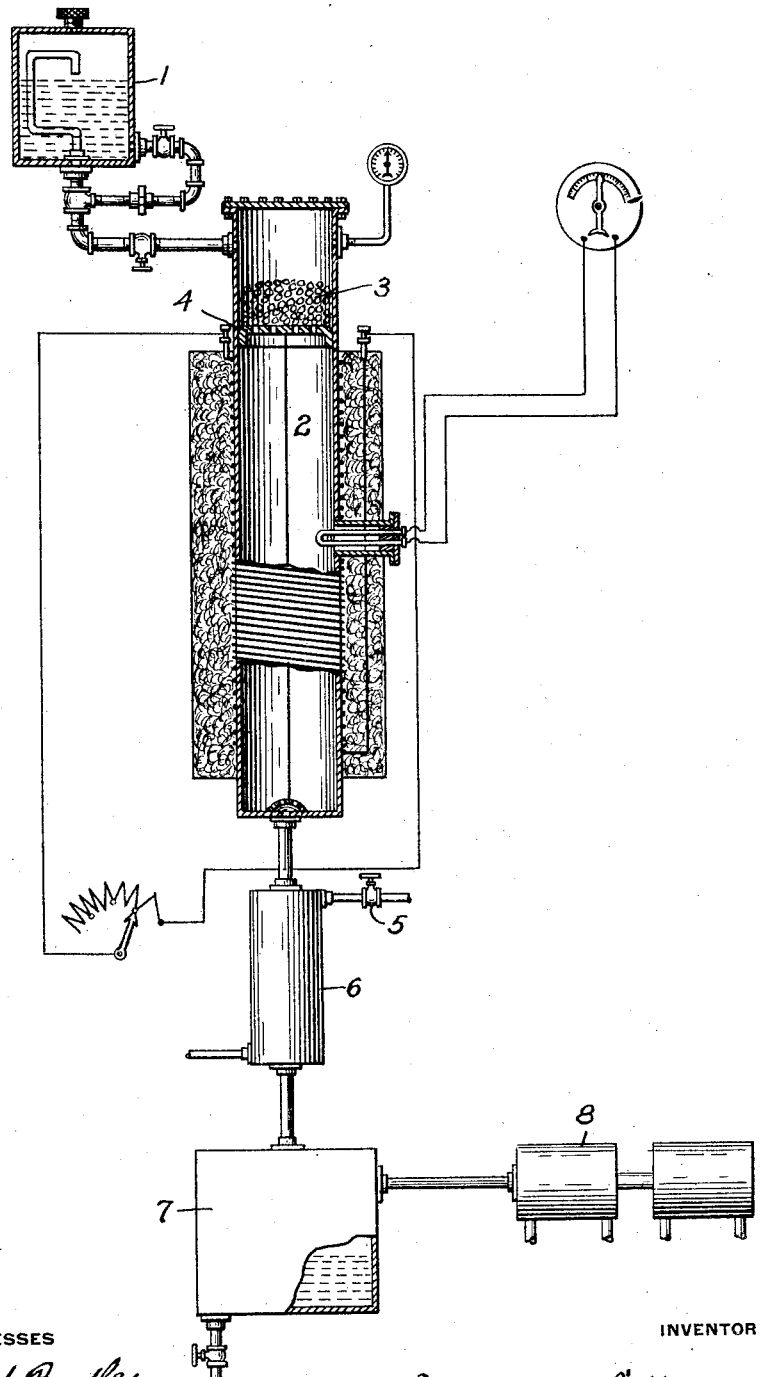
WITNESSES
INVENTOR
Walter F. Rittman

UNITED STATES PATENT OFFICE.

WALTER F. RITTMAN, OF PITTSBURGH, PENNSYLVANIA, ASSIGNOR TO SYNTHETIC HYDROCARBON COMPANY, OF PITTSBURGH, PENNSYLVANIA, A CORPORATION OF DELAWARE.

TREATMENT OF XYLENE AND OTHER SIMILAR HYDROCARBONS.

1,419,124.     Specification of Letters Patent.     Patented June 6, 1922.

Application filed July 7, 1915, Serial No. 38,461. Renewed December 27, 1921. Serial No. 525,048.

*To all whom it may concern:*

Be it known that I, WALTER F. RITTMAN, resident of Pittsburgh, in the county of Allegheny and State of Pennsylvania, have invented a new and useful Improvement in the Treatment of Xylene and Other Similar Hydrocarbons, of which the following is a specification.

The invention described herein relates to the manufacture of toluene, benzene, etc., from higher members of the same hydrocarbon series such as xylene, cymene, etc., ($C_n H_{2n-6}$). These hydrocarbons of the higher series, are by-products in the manufacture of aromatic hydrocarbons from petroleum, and are constituent parts of coaltar, oil gas tar, water gas tar and coke oven tar. A suitable material containing xylene, cymene, etc., is what is known in the trade as solvent naphtha, obtained in the distillation of coal-tar.

In the practice of my invention, the material to be treated, e. g., xylene, etc., or material containing substantial quantities thereof, is subjected to a temperature sufficiently high to effect a complete gasification thereof. The gases thus produced are subjected to a higher temperature to effect a cracking thereof and to a pressure which will facilitate the formation of new hydrocarbons.

In the treatment of the materials hereinbefore mentioned which, as is well known, contain xylene, cymene, etc., or the production of benzene, toluene, and other aromatic hydrocarbons it is desirable that the gases should not only be subjected to a high temperature to effect the cracking, but also at a substantially high pressure, i. e., sixty pounds and higher to facilitate the formation of new hydrocarbon combinations such as benzene, toluene, etc. In treating xylene, cymene, etc., such high pressures will cause the formation of an undesirably large percentage of carbon, and hence while the gases produced by heating the xylene, etc., and other high cyclic hydrocarbons, to a temperature above their boiling points, i. e., 220 to 225 C., may be subjected to a pressure of sixty pounds and upwards and a sufficient high temperature as hereinafter stated with good results as regards the production of benzene, toluene, etc., it is preferred to employ much lower pressures. Practice has shown that the percentage of carbon produced decreases rapidly as the pressure is decreased. The best results, i. e., high percentage of benzene, toluene, etc., and small percentages of carbon have been obtained by maintaining a pressure below one-half atmospheric, absolute, though good results may be obtained by the use of pressures up to 200 lbs. per square inch. It would seem that the retention of the cracked gases at a high temperature, as is necessary to obtain high pressures, affords opportunity for a complete disassociation of a considerable portion of the gases and the consequent production of carbon. Whereas when a pressure less than atmospheric is applied to the gases, there will occur not only a cracking due to the high temperature, but also a mechanical separation of the gases. As this mechanical separation supplements the cracking action of high temperatures, the gases will not be subjected to high temperatures sufficiently long to permit of complete disassociation of more than a small quanity of the gases.

In practical operation of the process at atmospheric pressure to produce benzene and toluene, it has been found that the production of gas (non-condensable product) is minimized, the condensate amounting to about 70% of the total quantity of original material, this condensate containing considerable amounts (about 20%) of benzene and toluene.

While any suitable temperature may be employed for effecting gasification of the material treated, the gases should be subjected to a temperature of four hundred degrees, centigrade (400 C.), and upwards. In practice I have found that the best results have followed, when employing a temperature between 600 degrees C. and 900 degrees C. By employing a temperature of about 800 degrees C. and a pressure of half an atmosphere in treating pure xylene ($C_8H_{10}$) containing practically no toluene, above 30% yield of toluene has been obtained with less than 1% of carbon.

But if the temperature be increased, and the same pressure, i e., one-half atmosphere, be maintained, the yield of toluene is decreased, and that of benzene increased.

In the accompanying drawing forming a part of this specification is shown partly in elevation and partly in section, a simple form of apparatus adapted to the practice of the process herein described.

The material to be treated is either fed by gravity from an elevated tank 1 or forced by a suitable pump into the upper portion of a chamber or receptacle 2 which is heated electrically or in any other suitable manner. In order to facilitate the gasification of the material it is preferred that the latter should be directed against a mass of balls 3 formed of metal or other suitable material and supported by a perforated disc 4 in the upper portion of the chamber or receptacle. The gases pass down through the chamber or receptacle 2, where they are cracked and new combinations formed. In case it is desired to maintain the gases under pressure the valve 5 in the blow-off pipe is kept closed and the pressure thus attained is held by regulating the flow of material to be treated into the upper portion of the chamber or receptacle. In case the pressure becomes excessive, the valve 5 can be opened temporarily and the excess allowed to escape. The gases flow from the chamber or receptacle into the condenser 6, from which the condensates pass into the receiver 7.

In case it is desired to operate under a pressure below atmospheric pressure, a vacuum pump indicated at 8 is connected to the receiving chamber 7.

I claim herein as my invention:

1. The process of converting high boiling aromatic hydrocarbons into low boiling aromatic hydrocarbons which comprises passing the vapors of such high boiling aromatic hydrocarbons through a heated zone maintained at a cracking temperature of not less than 400° C. and a pressure not exceeding 200 pounds per square inch, and condensing the so treated vapors.

2. The process of converting high boiling aromatic hydrocarbons into low boiling aromatic hydrocarbons which comprises passing the vapors of such high boiling aromatic hydrocarbons through a heated zone maintained at a cracking temperature of not less than 400° C. and a pressure below atmospheric pressure, and condensing the so treated vapors.

3. The process of converting high boiling aromatic hydrocarbons into low boiling aromatic hydrocarbons which comprises passing the vapors of such high boiling aromatic hydrocarbons through a heated zone maintained at a cracking temperature of not less than 400° C. and a pressure below one-half an atm. absolute, and condensing the so treated vapors.

4. The process of converting high boiling aromatic hydrocarbons into low boiling aromatic hydrocarbons which comprises passing the vapors of such high boiling aromatic hydrocarbons through a heated zone maintained at a cracking temperature between 600° and 900° C. and a pressure below one-half an atm. absolute, and condensing the so treated vapors.

5. The process of converting high boiling aromatic hydrocarbons into low boiling aromatic hydrocarbons which comprises passing the vapors of such high boiling aromatic hydrocarbons through a heated zone maintained at a cracking temperature between 600° and 900° C. and a pressure absolute not exceeding two hundred pounds per square inch, and condensing the so treated vapors.

In testimony whereof, I have hereunto set my hand.

WALTER F. RITTMAN.

Witness:
GEO. B. BLEMING.